July 9, 1963
T. BARABUTES ETAL
3,097,351
REMOTE METERING APPARATUS
Filed Jan. 28, 1959
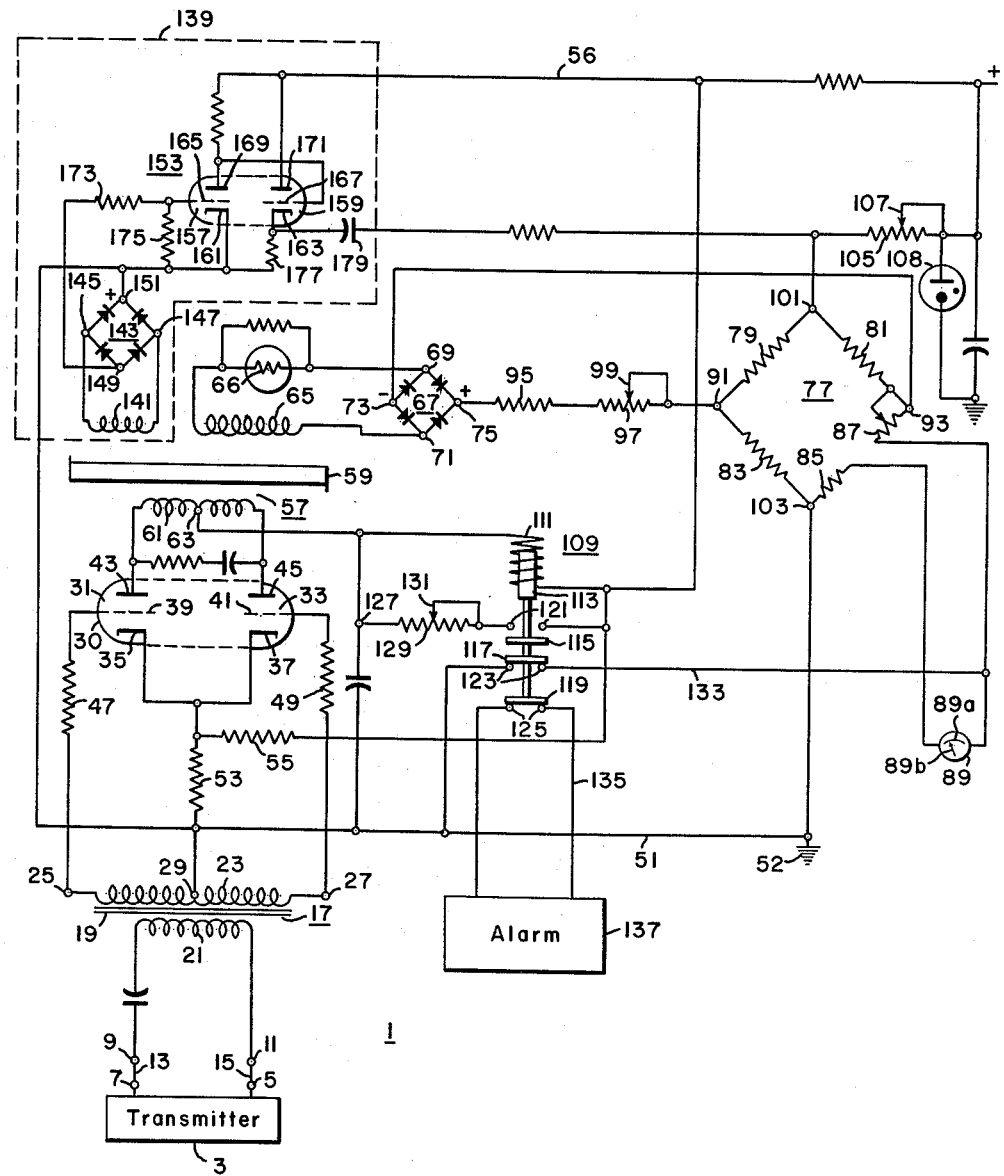
WITNESSES
John E. Healy, Jr.
James F. Young
INVENTORS
Theodore Barabutes &
Andrew Kulick, Jr
BY
David M. Schiller
ATTORNEY

United States Patent Office 3,097,351
Patented July 9, 1963

3,097,351
REMOTE METERING APPARATUS
Theodore Barabutes, Morris Township, Morris County, and Andrew Kulick, Jr., Passaic, N.J., assignors to Westinghouse Electric Corporation, East Pittsburgh, Pa., a corporation of Pennsylvania
Filed Jan. 28, 1959, Ser. No. 789,698
6 Claims. (Cl. 340—207)

This invention relates to remote metering apparatus and has particular relation to a device for receiving intelligence transmitted from a remote station.

In remote metering applications transmitters are provided to derive an alternating voltage output having a frequency proportional to the magnitude of a direct voltage input which may vary in accordance with a measured quantity. The alternating output is transmitted to a suitable receiver over a telemeter channel. The receiver is designed to convert the transmitted alternating voltage into a direct voltage having a magnitude proportional to the frequency of the alternating input voltage. This direct voltage is applied to a suitable measuring instrument which gives an indication of the frequency of the input.

In such applications it is desirable that means are provided to detect changes in the magnitude of the alternating voltage input to the receiver. This is for the reason that variations in the magnitude of the alternating input produce variations in the magnitude of the direct voltage output which are detected by the associated measuring instruments as false changes in the frequency of the alternating input.

In the present invention, improved means are provided for detecting a change in the magnitude of a voltage quantity. Such means may include a relay device which is connected for energization under the control of the alternating input to the receiver for operation in response to a preselected decrease in the magnitude of the alternating voltage to operate a suitable alarm device. The relay may also be designed to effect when operated a reduction of the instrument indication to a zero value in response to a preselected decrease in the magnitude of the alternating voltage.

In metering applications as described, the direct voltage output of the receiver, is ordinarily applied to measuring instruments through suitable filters provided for the purpose of removing ripple components from the direct voltage. In applications wherein the frequency of the alternating input to the receiver is of a low value such as a value of the order of 20 cycles per second, the moving elements of the measuring devices tend to vibrate at the frequency of the fundamental ripple component. At such low frequencies the provision of effective filters is impractical due to the long time delays inherent in low frequency filters and due to the high cost and bulky construction of such filters.

According to the present invention, improved means are provided for substantially eliminating undesirable ripple components of a direct voltage which possesses a direct component and superimposed ripple components. Such means may include a compensating source of direct voltage with ripple components having the same wave shape as the ripple components of the direct voltage output produced by the receiver. The compensating source of voltage is applied to means such as a condenser effective to remove the direct voltage component of the compensating voltage. The remaining ripple components of the compensating source and the receiver output voltage are applied to impedance means with the ripple components of the two voltages in phase opposition. The resultant voltage across the impedance means is observed to be substantially a pure direct voltage free of ripple components.

In a preferred embodiment of the invention a telemeter receiver is provided including means effective to detect a preselected decrease in the magnitude of the alternating voltage applied to the receiver terminals. Such means includes a relay device of the plunger type including an operating coil connected for energization under control of the alternating input voltage. The coil surrounds a suitable magnetic armature arranged to be attracted or picked up in response to preselected energization of the coil corresponding to a normal magnitude of the input voltage, and to be dropped out when the coil energization is reduced below a minimum value corresponding to a voltage value less than the normal value.

In the present invention, means are provided to permit adjustment of the ratio between the pick-up and drop-out energization of the coil. The arrangement is such that the drop-out energization may be set to correspond to any desired value of the alternating input voltage. When the armature drops out in response to a preselected decrease in the alternating input voltage below the normal value, suitable circuits may be established for performing operations which indicate such reduction.

The receiver also includes saturable magnetic core conversion means effective to produce from the alternating input voltage an alternating voltage consisting of a series of spaced pulses of constant volt-second area. This voltage is rectified to provide a series of spaced unidirectional pulses having an average magnitude proportional to the frequency of the alternating input voltage. This rectifier voltage is applied to a suitable differential resistance bridge containing four resistance legs with one leg including a measuring instrument which indicates the frequency of the alternating input voltage.

The ripple compensating means is effective to produce a series of spaced unidirectional pulses having the same wave shape as the rectified output voltage. The compensating voltage is applied to the resistance bridge through suitable amplifier means and a capacitor which effectively removes the direct voltage component of the compensating voltage. The remaining ripple components of the compensating voltage are applied with the output voltage to the instrument leg of the bridge with the ripple components of the two voltages in phase opposition with respect to each other whereby the ripple components of the output voltage are effectively compensated for.

It is therefore an object of the invention to provide a device of improved construction for deriving from an alternating voltage input a direct voltage output having an average magnitude proportional to the frequency of the input.

It is another object of the invention to provide improved means for compensaing for ripple components present in a rectified direct voltage quantity.

It is a further object of the invention to provide improved means for detecting a change in the magnitude of a voltage quantity.

It is still another object of the invention to provide a frequency type telemeter receiver including means for detecting a preselected decrease in the magnitude of an alternating voltage input to the receiver.

It is still a further object of the invention to provide a telemeter receiver for deriving from an alternating input a direct voltage output having a magnitude proportional to the frequency of the input with means for eliminating ripple components present in the direct voltage output.

It is still another object of the invention to provide a telemeter receiver including means for deriving from an alternating voltage input having a frequency within the range of 5 to 25 cycles per second, a substantially ripple-free direct voltage output having a magnitude proportional to such frequency.

Other objects of the invention will become apparent from the following description taken in conjunction with the accompanying drawing in which the single FIGURE is a schematic representation of a telemeter system constructed in accordance with the present invention.

Referring to the single FIGURE, there is illustrated a telemetering system represented generally by the numeral 1 including a transmitter 3 effective to transmit an alternating voltage having a frequency which is proportional to the magnitude of a direct input voltage variable according to a measured quantity of any desired nature. For example, the measured quantity may constitute voltage, current, power, temperature, etc. The transmitter 3 includes output terminals 5 and 7 which may be connected to a suitable telemetering channel such as pilot wires 13 and 15 over which the alternating output is transmitted. The transmitter 3 may be of the type shown and described in application Serial No. 717,901, filed February 27, 1958, now United States Patent 2,900,207 dated August 18, 1959 by Theodore Barabutes and Andrew Kulick, Jr., and assigned to the assignee of the present invention.

The system 1 includes further a telemeter receiver which is effective to derive from the received alternating output of the transmitter a direct voltage having a magnitude which is proportional to the frequency of the transmitter output. The receiver includes input terminals 9 and 11 which are connected to the channel for energization in accordance with the transmitter output. The receiver also includes a transformer 17 having a magnetic core 19 with a primary winding 21 which is connected to the input terminals 9 and 11. The transformer 17 also is provided with a secondary winding 23 having end terminals 25 and 27 and a center tap connection 29. The secondary winding 23 is effectively divided into two sections each having a separate voltage induced therein in response to energization of the winding 21.

In order to convert the alternating voltage input to the receiver into a direct voltage having a magnitude proportional to the input frequency, the receiver includes a converter device which is energized from the transformer 17. The converter device includes a suitable electronic valve arrangement illustrated in the form of a twin triode vacuum tube 30 having two triode sections 31 and 33 of identical construction. The sections 31 and 33 include respectively, cathodes 35 and 37, grids 39 and 41 and plates 43 and 45. The two voltages induced in the winding 23 each is applied to the grid-cathode circuit of a separate one of the sections 31 and 33 to provide a push-pull arrangement. For this purpose the terminals 25 and 27 of the winding 23 are connected to the grids 39 and 41 respectively through suitable resistors 47 and 49. The center tap connection 29 is connected to a negative conductor 51 of a suitable source of direct voltage. The conductor 51 is connected to ground as indicated by the ground connection 52. The cathodes 35 and 37 are connected together and are connected to the line 51 through a resistor 53. The cathodes are also connected through a resistor 55 to the positive line 56 of the direct voltage source.

The converter means includes further a transformer 57 which has a saturable magnetic core 59 preferably constructed of material exhibiting substantially rectangular hysteresis loop characteristics. A number of such magnetic materials are commercially available. For example, the core 59 may be constructed of an alloy comprising approximately equal parts of nickel and iron. The transformer 57 includes a primary winding 61 which is connected between the plates 43 and 45 of the tube sections 31 and 33. The winding 61 is provided with a center tap connection 63 which is connected to the positive line 56. The transformer 57 includes a secondary winding 65 which is wound on the core 59 in inductive relation with respect to the winding 61.

In operation, the tube sections 31 and 33 will conduct alternately on alternate half cycles of the input voltage applied to the winding 21. The connections are such that when the section 31 is conducting the core 59 is driven between opposing saturation levels in a first direction which is opposite to the direction in which the core is driven when the section 33 is conducting. This operation results in the induction of an alternating voltage across the winding 65 which consists of a series of spaced pulses of constant volt-second area.

It has been observed that the voltage induced in the winding 65 may vary with temperature changes to which the receiver is subjected. This variation is due at least in part to changes in the induction of the core 59 resulting from the temperature variations. The core 59 possesses a negative temperature coefficient in that its induction decreases in response to temperature increases. In order to compensate for this, a resistance 66 is connected in series with the winding 65 having a negative temperature coefficient. For example, the resistance 66 may comprise a thermistor effective to maintain the current in the winding 65 independent of temperature.

In order to derive a series of spaced unidirectional pulses from the induced alternating voltage, a suitable rectifier 67 is provided which is illustrated in the form of a full-wave bridge rectifier including, a pair of input terminals 69 and 71 which are connected across the winding 65 for energization in accordance with the induced voltage. A series of spaced unidirectional pulses appear across the output terminals 73 and 75 of the rectifier 67 which have the appropriate plus and minus signs associated therewith. This unidirectional voltage has an average magnitude which is proportional to the frequency of the alternating voltage applied to the terminals 9 and 11 and may be considered as comprising a direct current component and a ripple or alternating current component.

The voltage output of the rectifier 67 is applied to a differential resistance bridge 77 which includes resistors 79, 81, 83, 85 and 87. Each of the resistors 79, 81 and 83 is connected in a separate leg of the bridge 77 with the resistors 85 and 87 connected in series in the remaining leg. A suitable measuring instrument 89 is connected in the remaining leg between the resistors 85 and 87. The output voltage of the rectifier 67 is applied to opposing terminals 91 and 93 of the bridge 77. For this purpose, the negative terminal 73 of the rectifier is connected to the terminal 93 whereas the positive terminal 75 is connected to the terminal 91 through resistors 95 and 97. The voltage applied to the terminals 91 and 93 may be varied by adjustment of an electroconductive arm 99 which is in sliding contact with the resistor 97.

In order to obtain a balance of the bridge 77 at a particular frequency of the alternating input to the terminals 9 and 11 so that the instrument 89 will have a zero indication for the particular frequency, a constant voltage is applied to the terminals 101 and 103 of the bridge 77, which causes current to traverse the instrument 89 in a direction opposite to current through the instrument produced by voltage from the rectifier 67. For this purpose the terminal 101 is connected to the positive line 56 through a resistor 105 which has an electroconductive arm 107 in sliding contact therewith. Adjustment of the arm 107 permits variation in the amount of current supplied to the bridge 77 from the line 56 to thereby permit adjustment of the bridge balance point. The remaining bridge terminal 103 is connected to the negative line 51. A voltage regulating tube 108 is connected across the terminals 101 and 103 so that the voltage supplied to these terminals is maintained substantially constant.

In operation, current from the rectifier 67 and current from the line 56 flow through the instrument 89 in opposing directions. Consequently, by adjustment of the arm 107 the currents through the instrument 89 may be made equal to provide a zero indication for any desired frequency of the alternating voltage applied to the terminals 9 and 11. The resulting current traversing the instrument 89 has a magnitude which is directly proportional to the frequency of the input voltage.

The instrument 89 may be of any desired type. For example, the instrument may be of the indicating or recording type. The instrument is illustrated as of the indicating type including a scale 89a which is traversed by a suitable pointer 89b. If it be assumed that the frequency of the input voltage is variable between 15 and 35 cycles per second, the bridge 77 is balanced at an input frequency of 15 cycles per second when the instrument 89 is calibrated with a zero marking at the left-hand side of the scale 89a. If the instrument 89 is of the type having a zero calibration point at the center of the scale 89a, the bridge 77 is balanced at an input frequency of 25 cycles per second.

In a telemetering system as thus far described, it is desirable that means be provided to detect a change in the magnitude of the alternating voltage applied to the terminals 9 and 11. This is for the reason that the instrument 89 provides an indication which varies in accordance with the magnitude of the alternating input as well as in accordance with the frequency of the input. Consequently, even if the frequency of the input does not change, the instrument 89 can provide a change in indication in response to a variation in the magnitude of the input.

In the present invention means are provided to detect a preselected reduction in the magnitude of the alternating input to the receiver. Under normal operating conditions of the system the magnitude of the alternating voltage transmitted by the transmitter 3 will remain substantially constant. However, if failure of portions of the transmitter 3 occur, the output voltage from the transmitter may be substantially reduced. Failure of the transmitting channel can also cause a reduction in the magnitude of voltage applied to the terminals 9 and 11 of the receiver.

The detecting means in the present invention includes a relay device 109 which may be of the conventional plunger type including an operating member in the form of a coil 111 which is connected between the center tap 63 of the winding 61 of the transformer 57 and the line 56. The coil 111 surrounds a suitable operated member in the form of a magnetic armature 113 which carries a plurality of electroconductive bridging contacts 115, 117 and 119 cooperating respectively with pairs of spaced terminals 121, 123 and 125.

The terminals 121 are included in a circuit 127 which is connected in shunt relation with the coil 111. The terminals 123 are connected in a circuit 133 which shunts the instrument 89. The terminals 125 are connected in a circuit 135 which includes a suitable translating device 137 which may constitute an alarm device such as a bell or a flashing light. The relay 109 is illustrated with its coil 111 deenergized and the armature 113 in a drop-out condition wherein the contact 115 is spaced from its terminals 121, the contact 117 engages its terminals 123 and the contact 119 engages its terminals 125. In this condition the circuit 127 is interrupted, whereas the circuits 133 and 135 are established.

The relay 109 is arranged so that the armature 113 will be picked up in response to normal operating conditions of the transmitter 3 and the telemetering channel. To this end the resistors 53 and 55 are selected so that the tube sections 31 and 33 are biased to cut-off in the absence of voltage at the terminals 9 and 11. The relay 109 is designed so that the coil 111 will be sufficiently energized through the sections 31 and 33 to pick up the armature 113 for a normal magnitude of voltage at the terminals 9 and 11.

When the armature is picked up, the circuit 127 is established and the circuits 133 and 135 are interrupted. Establishment of the circuit 127 is effective to shunt a portion of the energization supplied to the coil 111 away from the coil to thereby reduce the energization of the coil. In relays of the plunger type the energization of the operating coil required to pick up the associated armature from its drop-out condition is greater than the coil energization required to maintain the armature in its picked up condition. This characteristic limits the range of minimum input voltages below which the relay will operate to allow the armature to drop out. For example, if the armature is picked up at a value of 10 volts of the input voltage then the armature will remain in its picked up condition until the input voltage is reduced below a value of the order of 2½ volts. Consequently, the relay is ineffective to detect a reduction of the input voltage from a value of 10 volts to a value of 2½ volts.

With the provision of the shunt circuit 127 the energization of the coil 111 may be reduced to substantially the drop-out value in response to pick-up of the armature. For the assumed condition, the shunt circuit 127 may provide a drop-out energization which corresponds to approximately 9 volts for a pick-up energization corresponding to 10 volts of the input voltage. Consequently, a reduction in the input voltage to a value less than 9 volts will cause the armature to drop out to establish the circuits 133 and 135.

In order to permit adjustment of the drop-out energization of the relay 109, the shunt circuit 127 includes a resistor 129 having an electroconductive arm 131 in sliding contact therewith. Adjustment of the arm 131 is effective to vary the resistance of the circuit 127 to thereby vary the amount of energization which is shunted away from the coil 111. For example, if the arm 131 is adjusted to the extreme right-hand end of the resistor 129 the resistance of the circuit 127 is a maximum, and consequently the energization of the coil 111 is also a maximum. This has the effect of providing a drop-out energization which corresponds to a low value of the input voltage such as for example 3 volts. However, if the arm 131 is adjusted to the left from its extreme right-hand position the voltage of the input for which the relay will drop out will be increased from the value thereof for the preceding condition.

The relay 109 is effective to detect very small reductions in the input voltage. By means of the arm 131 the value of the input voltage below which the relay 109 will drop out may be varied over a considerable range. Establishment of the circuit 133 in response to drop out of the armature is effective to reduce the energization of the instrument 89 to a zero value to thereby permit an indication of a reduction in the input voltage below a preselected value. Such reduction will also establish the circuit 135 to cause operation of the alarm 137 to provide a further indication of the reduction.

In certain applications the output voltage from the rectifier 67 may be applied to the bridge 77 through a suitable filter network (not shown) provided for the purpose of minimizing the magnitudes of the ripple or alternating components present in the rectified voltage. Such ripple components are undesirable in that the moving system of the instrument 89 will tend to vibrate at the fundamental ripple frequency thereby producing an uninformative indication of frequency of the input voltage. This is especially true at low frequencies of the input voltage such as frequencies less than 20 cycles per second.

For certain applications it may be desirable to provide a receiver having an operating frequency range between 5 and 25 cycles per second rather than the range of 15 to 35 cycles per second as previously mentioned. In order to provide the 5 to 25 cycles per second range it is necessary that the ripple components present in the voltage produced by the rectifier 67 be substantially entirely eliminated. Although conventional filters may be employed for this purpose, such filters possess long time delays and are very costly and of bulky construction when designed to effectively eliminate ripple components at frequencies of the order of 5 cycles per second.

In the present invention an arrangement is provided for substantially eliminating the ripple or alternating components present in a rectified direct voltage which is of simple and inexpensive construction. In the single FIGURE, the ripple compensator is shown enclosed in the area bounded by the broken line 139. The compensator 139 incorporates means for producing a voltage having the same wave shape as the voltage produced by the rectifier 67. Means are also provided to apply the compensating voltage to the instrument leg of the bridge 77 through a condenser such that the direct voltage component of the compensating voltage is blocked from the bridge 77 and the remaining ripple or alternating components are applied in phase opposition with respect to the ripple or alternating components present in the voltage from the rectifier 67.

For this purpose the compensator 139 includes a winding 141 which surrounds the core 59 of the transformer 57 in inductive relation with the winding 61. With this arrangement a voltage is induced in the winding 141 which has the same wave shape as the voltage induced in the winding 65. Voltage induced in the winding 141 is applied to input terminals 145 and 147 of a rectifier 143 which may be similar in construction to the rectifier 67. The voltage appearing at the output terminals 149 and 151 of the rectifier 143 is of substantially identical wave shape as the voltage appearing across the output terminals of the rectifier 67. The compensating voltage may be applied to a suitable amplifier arrangement 153 which may consist of a direct voltage amplifier 157 which is directly coupled to a cathode follower amplifier 159. The amplifiers 157 and 159 may be in the form of triode vacuum tube sections including respectively, cathodes 161 and 163, grids 165 and 167 and plates 169 and 171.

The compensating voltage is applied between the grid 165 and cathode 161 of the amplifier 157 across resistors 173 and 175 so that the grid 165 is negative with respect to the cathode 161. The resulting amplified voltage is directly coupled to the grid 167 of the amplifier 159. The amplified voltage produced by the amplifier 159 appears across the cathode resistor 177 and is applied to the terminals 101 and 103 of the bridge 77 through a condenser 179. The condenser 179 is effective to block the direct voltage component of the amplified voltage from the bridge 77 so that only the remaining ripple or alternating components are applied to the bridge 77.

With the connections as shown, the compensating ripple or alternating components are applied to the leg of the bridge 77 including resistors 85 and 87 in phase opposition with respect to the ripple or alternating components present in the voltage produced by the rectifier 67. By proper selection of the values of the resistor 173, the condenser 179 and the resistors in the bridge 77, the ripple alternating components present in the leg of the bridge including resistors 85 and 87 can be reduced to substantially a zero value. Consequently, the moving system of the instrument 89 will be energized with substantially solely the direct current component and therefore free from undesirable vibrations for very low frequencies of the input voltage.

Although the invention has been described with reference to certain specific embodiments thereof, numerous modifications are possible and it is desired to cover all modifications falling within the spirit and scope of the invention.

We claim as our invention:

1. In an electrical system, a source of alternating voltage having a frequency variable in accordance with the magnitude of a measured quantity, converter means connected for energization from said source to produce a direct voltage having a magnitude dependent upon said frequency, a measuring instrument connected for energization in accordance with said direct voltage magnitude to provide an indication of said frequency, said instrument being actuated substantially independently of the magnitude of said source voltage above a predetermined voltage magnitude and actuated dependently of the magnitude of said source voltage below said predetermined voltage magnitude, and control means operable in response to a preselected change in the magnitude of said source voltage below said predetermined voltage magnitude to effect a zero indication of said instrument.

2. In a telemeter receiver, a pair of input terminals for energization by an input source of alternating voltage having a frequency variable in accordance with the magnitude of a measured quantity, a pair of electronic valves each having a control electrode, said control electrodes being connected for opposed polarity energization in accordance with said input voltage, a transformer having a saturable magnetic core means and input and output winding means, each of said winding means linking said core means in inductive relation, said input winding means having a center tap connection providing a pair of winding sections, a pair of supply terminals adapted to be connected to a source of unidirectional electrical potential, means connecting each of said winding sections through a separate one of said valves whereby said winding sections are energized under control of said valves to transfer said core means between opposing levels of saturation each half input cycle, a load device, means including rectifier means connecting said load device said output winding means to energize said load with a direct output voltage, control means including a relay coil connected for energization in accordance with current traversing said valves, an armature movable to an actuated position in response to preselected energization of said coil, and means operably connected to said load device and operable in response to movement of said armature to alter the energization of said load device.

3. In an electrical system, a pair of input terminals adapted to be energized from a source of alternating voltage having a frequency variable over a predetermined range, converter means including a transformer having a saturable magnetic core means and input winding means linking the core means and a pair of output winding means inductively linking the core means said input winding means being connected for energization in accordance with the frequency of said alternating voltage to transfer said core means between opposing levels of saturation each half input cycle, separate rectifier means connected for energization in accordance with voltage induced in each of said output winding means to produce a pair of output voltages each having a direct component and an alternating component, the waveforms and frequencies of the alternating components of said output voltages being substantially the same, impedance means connected for energization from one of said output voltages, direct current blocking means and circuit means including said direct current blocking means connected to apply to said impedance means solely said alternating component of the other of said output voltages in phase opposition relative to the phase of said alternating component of said one output voltages.

4. In an electrical system, a source of alternating voltage having a frequency variable in accordance with a measured quantity, converter means including a transformer having a saturable magnetic core means and input winding means and a pair of output winding means linking the core means in inductive relation, said input winding means being connected for energization in accordance with the frequency of said alternating voltage to transfer said core means between opposing levels of saturation each half input cycle, separate rectifier means connected for energization in accordance with voltage induced in each of said output winding means to produce a pair of direct output voltages having average magnitudes which vary with the frequency of said alternating voltage, a resistance bridge including four resistance legs providing two pairs of terminals, a source of direct voltage, one pair of said terminals being connected for energization from said source of direct voltage, the other pair of said terminals being connected for energization in accordance with one of said direct output voltages, a direct-current responsive instrument connected in one of said legs between one terminal of said one pair of terminals and one terminal of said other pair of terminals for differential energization in accordance with said one of said direct output voltages and said source of direct voltage, said one of said direct output voltages having a direct component and an alternating component, circuit means connected to apply the other of said direct output voltages between said one pair of terminals with said alternating components of said output voltages in phase opposition in said one of said legs, and a condenser included in said circuit means to block the direct component of said other of said output voltages from said one pair of terminals.

5. In an electrical system, a first pair of terminals adapted to be energized from a source of alternating voltage, a second pair of terminals adapted to be energized from a source of unidirectional potential, a saturable core transformer having a primary winding and first and second secondary windings, a current flow control device having main terminals and control terminals, circuit means connecting said main terminals and said primary winding across said second pair of terminals, circuit means connecting said first pair of terminals to said control terminals, load means, means including asymmetric current conducting means connecting said first secondary winding to said load means to energize said load means with a first unidirectional voltage, said first unidirectional voltage having an alternating component and a direct voltage component, means energized from said second secondary winding for compensating for said alternating component of said first unidirectional voltage, said compensating means including asymmetric current conducting means to provide a second unidirectional output voltage, said second unidirectional voltage having a wave shape substantially identical to the wave shape of said first unidirectional voltage with a direct voltage component and an alternating component, means including direct current blocking means connecting compensating means to said load means in a polarity such that said alternating components are relatively displaced by 180 degrees to thereby supply solely said alternating component of said second unidirectional voltage to said load means, relay means including operated means and operating means, said relay means being effective when energized to operate said operated means from a first condition to a second condition, circuit means connecting said operating means between said primary winding and one of said second pair of terminals for energization by the current flow through said primary winding, and circuit means connecting said operated means for effecting a change in energization of said load means when said operated means is in one of its said conditions.

6. In an electrical system, a first pair of terminals adapted to be energized from a source of alternating voltage having a frequency less than twenty-five cycles per second and which frequency is variable in accordance with the magnitude of a measured quantity, a second pair of terminals adapted to be energized from a source of unidirectional potential, a saturable core transformer having a primary winding and first and second secondary windings, a current flow control device having main terminals and control terminals for controlling current flow between said main terminals, circuit means connecting said main terminals and said primary winding across said second pair of terminals, circuit means connecting said first pair of terminals to said control terminals, load means, means including asymmetric current conducting means connecting said first secondary winding to said load means to energize said load means with a first unidirectional voltage having an alternating component and a direct component, means energized from said second secondary winding for compensating for said alternating component of said first unidirectional voltage, said compensating means including asymmetric current conducting means to provide a second unidirectional output voltage, said second unidirectional voltage having a wave shape substantially identical to the wave shape of said first unidirectional voltage with a direct voltage component and an alternating component, means including capacitive means connecting said compensating means to said load means in a polarity such that said alternating components are relatively displaced by 180 degrees to thereby supply solely said alternating component of said second unidirectional voltage to said load means, relay means including a control winding and a set of normally closed contacts and a set of normally open contacts, circuit means connecting said control winding between said primary winding and one of said second pair of terminals for energization by the current flow through said primary winding, circuit means connecting said normally closed contacts in shunt circuit with said load means, an impedance, and circuit means including said normally open contacts connecting said last-named impedance in shunt circuit with said control winding.

References Cited in the file of this patent

UNITED STATES PATENTS

| | | |
|---|---|---|
| 2,026,421 | Fecker | Dec. 31, 1935 |
| 2,259,070 | Krochmann | Oct. 14, 1941 |
| 2,335,612 | Reiskind | Nov. 30, 1943 |
| 2,524,334 | Spinasse | Oct. 3, 1950 |
| 2,591,184 | Mudd | Apr. 1, 1952 |
| 2,749,534 | Threadgold | June 5, 1956 |
| 2,899,629 | Kubler | Aug. 11, 1959 |